Figure 3:
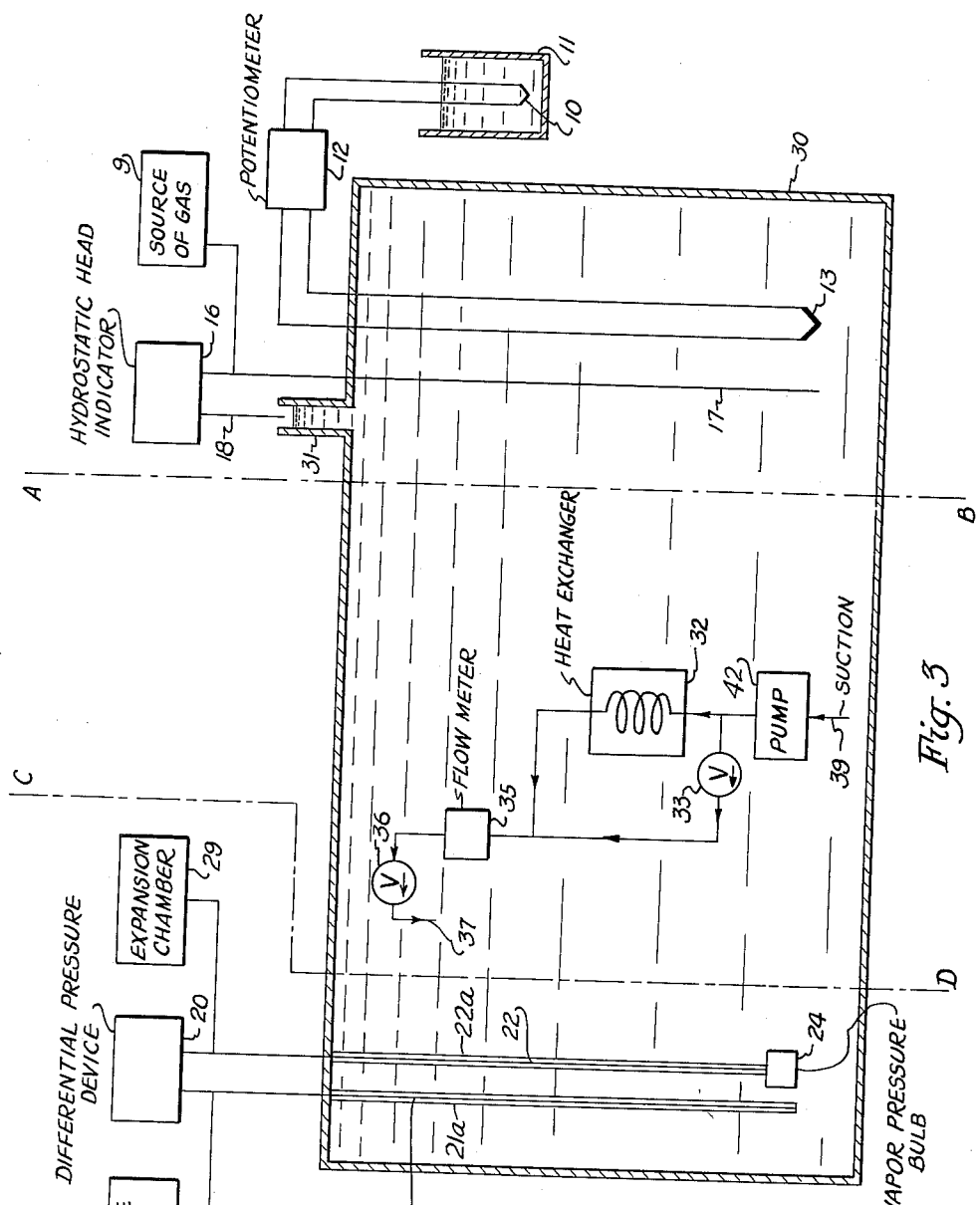

Sept. 18, 1962 R. J. HARDY ET AL 3,054,289
SYSTEM FOR MEASURING NET POSITIVE SUCTION HEAD OF PUMPS
Filed June 3, 1960 3 Sheets-Sheet 1
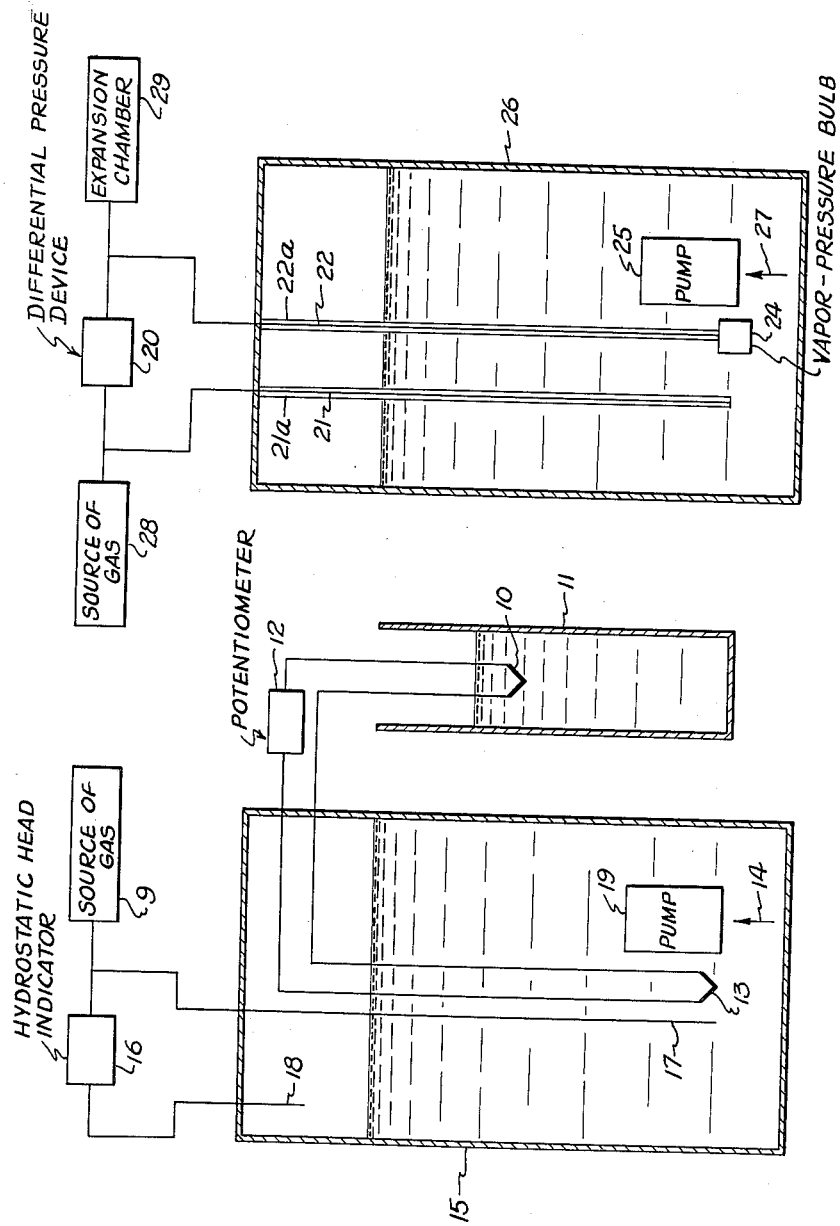
INVENTORS
Richard J. Hardy
Kenneth B. Martin
Robert B. Jacobs
BY
ATTORNEYS Sept. 18, 1962 R. J. HARDY ET AL 3,054,289
SYSTEM FOR MEASURING NET POSITIVE SUCTION HEAD OF PUMPS
Filed June 3, 1960 3 Sheets-Sheet 2

INVENTORS
Richard J. Hardy
Kenneth B. Martin
Robert B. Jacobs
BY David Robbins
John C. Stahl ATTORNEYS

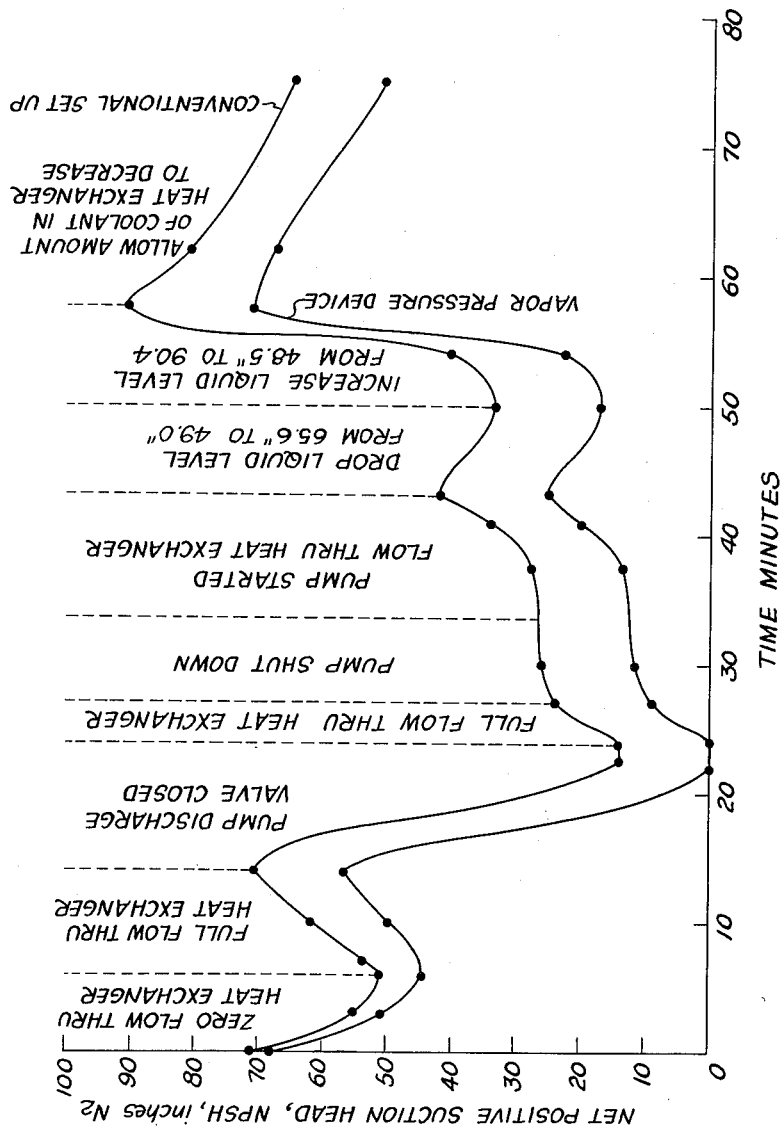

United States Patent Office 3,054,289
Patented Sept. 18, 1962

3,054,289
SYSTEM FOR MEASURING NET POSITIVE
SUCTION HEAD OF PUMPS
Richard J. Hardy, Arlington, Calif., and Kenneth B. Martin, Naperville, Ill., and Robert B. Jacobs, Boulder, Colo., assignors to the United States of America as represented by the Secretary of Commerce
Filed June 3, 1960, Ser. No. 33,871
7 Claims. (Cl. 73—168)

This invention relates to a system for measuring the characteristics of a pump, and in particular, to one for measuring the net positive suction head of a pump.

The net positive suction head, hereafter referred to as NPSH, is the difference between the actual stagnation pressure and the vapor pressure of a liquid at the suction of a pump. It is one of the more important quantities which must be determined during the evaluation of pump characteristics, especially with regard to cavitation.

The conventional systems for determining NPSH may vary in details because of differences in pumps and test equipment, but in general they require the measurement of both pressure and temperature. If the stagnation pressure (total head) cannot be measured directly, separate determinations of the static and dynamic pressures are made, the latter requiring flow measurements. From temperature measurements and vapor-pressure data, the vapor pressure is obtained. A subtraction then gives the NPSH.

Conventional systems are not satisfactory for all fluids. For example, the determination of the NPSH with liquid hydrogen to an accuracy of one inch requires a temperature measurement accurate to about 0.0005 K. Since the only simple, inexpensive device that will give this accuracy is the vapor-pressure thermometer, the selection of instruments in many applications is exceedingly limited.

Accordingly, it is an object of the present invention to provide a system for directly measuring and indicating the NPSH, making computations unnecessary.

Another object of the present invention is to provide a system for determining the NPSH for a working substance such as hot water, butane and liquid oxygen, hydrogen or nitrogen with a pressure measurement but without an extremely accurate temperature measurement.

With these and other objects in view, reference is now made to the following description taken in connection with the accompanying drawings in which the same number refers to like parts and wherein:

FIG. 1 is a conventional system in the prior art.
FIG. 2 is an embodiment of the present invention.
FIG. 3 is a diagram of the equipment employed to obtain the curves in FIG. 4.
FIG. 4 is a curve of NPSH versus time for liquid nitrogen obtained for the conventional system in FIG. 1 and a curve of the same relationships obtained for the embodiment in FIG. 2.

In accordance with the teachings of the present invention, a differential-pressure measuring device is positioned between a stagnation-pressure tube and a vapor-pressure bulb and tube. The latter two are located in the area of the pump entrance. Since the stagnation-pressure tube transmits the stagnation pressure to one side of the differential-pressure device while the vapor-pressure tube transmits the vapor pressure to the other, if the scale of the pressure device is calibrated in height of liquid, the NPSH will be indicated directly.

Referring to FIG. 1, reference junction 10, located in reference container 11, is connected through potentiometer 12 to thermocouple junction 13 located in sump container 15 at the entrance to pump 19. The pump suction is indicated by arrow 14. The sump and reference containers hold the same liquid. Hydrostatic head indicator 16 is positioned between lower and upper pressure taps 17 and 18, the former located at the pump suction and the latter above the liquid in the sump container. Source of gas 9 is connected to lower pressure tap 17. The surfaces of the liquid in both sump container 15 and reference container 11 are at atmospheric pressure.

When reference junction 10 is well tempered and located near the surface of a liquid such as nitrogen, boiling violently, if the liquid in both containers have the same composition, thermocouple junction 13 will measure the difference between the temperature of the liquid at the pump suction and the boiling point corresponding to the pressure on the surface of the liquid in reference container 11. Hydrostatic head indicator 16 measures the difference in pressure between the surface of the liquid and the pump suction. Thus, if the difference in vapor pressure, corresponding to the measured temperature difference, is subtracted from the hydrostatic head, the NPSH is obtained.

Referring to FIG. 2, differential-pressure device 20 is positioned between stagnation-pressure tube 21 and vapor-pressure tube 22. The stagnation-pressure tube may be enclosed in vacuum jacket 21a for reasons given below. Vapor-pressure bulb 24 is located at one end of the vapor-pressure tube. The stagnation-pressure tube, vapor-pressure tube, vapor-pressure bulb, and pump 25 are located in sump container 26 which in a typical example may contain liquid oxygen, hydrogen, nitrogen, hot water, or butane. Arrow 27 indicates the direction of suction. Source of gas 28, which in a typical example may provide helium, and expansion chamber 29 are connected to stagnation-pressure tube 21 and vapor-pressure tube 22, respectively.

Although FIG. 2 shows vapor-pressure bulb 24, vapor-pressure tube 22 and stagnation-pressure tube 21 located in sump container 26 with pump 25, it is understood that the pump may be line-mounted in which case the vapor-pressure bulb and stagnation-pressure tube are located in the suction piping at the entrance to the pump.

Differential-pressure device 20 may be a gage, manometer, transducer, etc. having a scale calibrated in height of liquid so that the NPSH may be read directly. If it is desired to perform liquid hydrogen pumping tests, differential-pressure device 20 may be a transducer with a range of ±0.1 p.s.i.d. For liquid nitrogen pumping tests, the device may be a 0 to 100 in. of $H_2O$ differential-pressure gage.

Since vapor-pressure tube 22 and vapor-pressure bulb 24 function as a vapor-pressure thermometer, they should be selected to fulfill the desired requirements for such a device. The volume of vapor-pressure bulb 24 must be large enough so that the liquid vapor interface always remains in the bulb. As condensation should take place only in the vapor-pressure bulb, it must be the coldest part of the system; if there is liquid in vapor-pressure tube 22 an error will be introduced. For liquified gases, vapor-pressure tube 22 is preferably made of stainless steel and is enclosed in vacuum-insulated jacket 22a from its room temperature end down to vapor-pressure bulb 24. The heat conduction down the vapor-pressure tube is sufficient to prevent the undesired condensation. If necessary, an electric heater may be installed in the jacket to supplement the heat conducted down the tube. The use of such a heater is necessary in cases where the temperature of the pumped liquid is near or above ambient temperature. Obviously, vapor-pressure bulb 24 should be designed and placed so that it has a minimum effect on the pump characteristics.

Stagnation-pressure tube 21 is merely a tube with its lower end open to the liquid at the pump suction entrance, so that when the liquid is prevented from rising in the tube, the pressure communicated to differential-pressure device 20 is that existing in the liquid at the open end.

(If desired, a correction for the hydrostatic head of gas in the tube can be made.) Two arrangements are used to prevent liquid from rising in the tube: (1) Stagnation-pressure tube 21 is insulated with a vacuum jacket 21a so that the heat conducted down the tube evaporates any liquid which may rise therein. An electric heater can be installed (not shown) at the lower end of the tube to supplement the heat conduction. (2) A very small flow of gas is forced down the tube from the source of gas 28, thus keeping out all liquid by depressing the liquid-gas interface so that it is located at the open end of the stagnation tube 21. The flow must be small so that only a negligible pressure difference down the tube is created. The gas should be prevented from entering the pump.

In applications where the pressure in a suction pipe is to be measured, stagnation-pressure tube 21 must be a total head device and should have a minimum effect on the fluid flow. It should be noted that, except for friction effects in the suction pipe, the NPSH measured in a sump should not differ substantially from that measured in a suction pipe.

Since liquids with low boiling points can produce very high pressures in the vapor-pressure system when allowed to warm to room temperature, to protect the system and differential-pressure device 20, the gas is allowed to expand into expansion chamber 29. Another means for accomplishing this end would be to permit the gas to escape from vapor-pressure bulb 24, replenishing it each time the system is cooled. In the latter case, it is important that the escape passage have a capacity sufficient to handle the vapor which can form exceedingly rapidly.

For proper operation, it is important that vapor-pressure tube 22 and vapor-pressure bulb 24 be filled with a fluid which is, as nearly as possible, identical to the fluid being pumped. If the fluids differ appreciably, they must be analyzed and corrective computations be made. For example, if nitrogen being pumped has a 2% oxygen impurity while that in vapor-pressure bulb 24 has none, an error of over 10 inches in the NPSH will result; more than this amount of oxygen can condense from the atmosphere into liquid nitrogen as a result of poor handling techniques. As another example, consider the effect of ortho-para composition in liquid hydrogen: If the ortho-para composition in the vapor-pressure bulb 24 differs from that entering pump 25 by 5%, the NPSH will be in error by about 12 inches. Difficulties from this source can be overcome by placing suitable catalysts in vapor-pressure bulb 24 and in the sump container 26 to insure that equilibrium hydrogen exists in both places.

Referring to FIG. 3, it is noted that the elements to the right of dotted line A—B is the conventional system shown in FIG. 1, while the elements to the left of the dotted line C—D is the embodiment of the present invention shown in FIG. 2. Sump container 30 has a stand pipe 31 wherein pressure tap 18 is positioned above the level of the liquid. Pump 42 is connected to heat exchanger 32 and through valve 33 to flowmeter 35. The heat exchanger is connected through the flowmeter and discharge valve 36 to discharge tube 37.

FIG. 4 represents the results of a test conducted with the arrangement in FIG. 3 to compare the NPSH of liquid nitrogen under different operating conditions as measured by the conventional system and the embodiment of the present invention. Pump 42 used for the test was an aircraft fuel booster pump of a conventional type that effectively handles liquid-gas mixtures. Differential-pressure device 20 and hydrostatic indicator 16 were each 0 to 100 in. of $H_2O$ differential pressure gages. Thermocouple 13 and reference junction 10 were gold with a 2.1 atomic percent impurity of cobalt vs. copper; their sensitivity at liquid nitrogen temperature is approximately 35 microvolts per deg. K. Potentiometer 12 had a least reading of ½ microvolt. The temperature measurements were thus accurate to about 0.059° K. This corresponds to a vapor pressure measurement that is accurate to 2.34 inches of liquid nitrogen. Thus, in FIG. 4, the curve for the present embodiment is reliable to about 1 in. of liquid nitrogen, while the curve for the conventional system is reliable to about 2.3 in. of liquid nitrogen.

The NPSH was varied over the period shown by changing the pressure and temperature at the pump suction and the indication of each NPSH on differential-pressure device 20 and hydrostatic indicator 16 was recorded. The pressure was altered by changing the liquid level (hydrostatic head) in stand pipe 31 while the temperature was altered in the following manner: After being discharged from pump 42, the liquid passed through heat exchanger 32 where it was cooled by liquid nitrogen boiling at atmospheric pressure. The degree of cooling was varied by changing the amount of coolant in the heat exchanger and by changing a proportion of the pump discharge that flowed through the same. The temperature of the liquid at pump suction 39 could thus be varied from the normal boiling point to the saturation temperature corresponding to the suction pressure; the NPSH was varied from zero to the maximum liquid level attainable in the apparatus.

FIG. 4 shows that the values of NPSH indicated by the two methods differed by about 15 in., the conventional system consistently yielding higher results than the present embodiment. Since the purpose of the test was not to prove the superiority of one method relative to the other, but merely to indicate the reliability and accuracy of the present embodiment, it is necessary that differences in results obtained be explained to indicate, if possible, which curve is more likely to be correct.

There are two reasons for believing that the curve obtained for the present embodiment is more accurate and therefore that the embodiment is reliable: (1) the curve for the embodiment indicates the behavior expected during the test, (2) an explanation of why the conventional system can be erroneous has been found, but no potential source of inaccuracy has been found in the present embodiment.

The explanation of the first reason is that at time equal to 14½ min. (see FIG. 4) the pump discharge valve 36 was closed; thus, all the energy which entered sump container 30 through the pump shaft should increase the liquid temperature and rapidly reduce the NPSH to zero. (Because of the extremely effective insulation of sump container 30 and the location of the vapor-pressure bulb 24 and thermocouple 13, it is not possible for the NPSH to tend to a steady-state value greater than zero. On the other hand, as the turbulence in the sump container 30 was very great, it is improbable that the liquid would become sufficiently superheated to cause the NPSH to tend toward a negative steady-state value.) The figure shows that the present embodiment indicated the expected behavior, i.e., the NPSH did go to zero.

In the second place, the NPSH indicated by the conventional system could be erroneous because the composition of the liquid in reference container 11 could be different from that of the liquid in sump container 30. As mentioned previously, unless care is taken, appreciable amounts of oxygen will condense from the atmosphere into liquid nitrogen that is being poured into, or is standing in, an open container. If this occurred with the nitrogen at reference junction 10 (and it is very possible) its temperature would be too high; this would make the temperature at the pump suction appear too low, and thus indicate an NPSH that is too high. An oxygen impurity of only 3% would cause the discrepancy between the curves in FIG. 4. On the other hand, because the nitrogen in both vapor bulb 24 and sump container 30 were obtained from the same container and was not exposed to the atmosphere, the required identity of composition was achieved with the present embodiment.

Another explanation for the difference between the curves in FIG. 4 is based upon the necessity for having the liquid in reference container 11 of the conventional system boiling violently. The violent boiling requires that the liquid be superheated; a superheat of only 0.22° K. being required to cause the difference shown in FIG. 4.

Obviously, many modifications and variations in the present invention are possible in the light of the above teachings. It is therefore to be understood, that within the scope of the appended claims, the invention may be practiced otherwise than as specifically described.

What is claimed is:

1. In a system for measuring the net positive suction head of a pump, a container for holding a selected liquid, a pump positioned so that its entrance is in said liquid, first means positioned in said liquid and near the entrance of said pump for measuring the magnitude of the stagnation pressure of said liquid, second means positioned in said liquid and near the entrance of said pump for measuring the magnitude of the vapor pressure of said liquid, means connected between said first and second means for providing an indication in dependency upon the difference between the magnitudes of stagnation pressure and vapor pressure.

2. In a system for measuring the net positive suction head of a pump, first means for containing a selected fluid, a pump positioned so that its entrance is in said liquid, a vapor-pressure bulb positioned in said liquid near the entrance of said pump, a differential-pressure measuring device having a first and second end, the first end being connected to said vapor-pressure bulb, and a stagnation-pressure tube having one end positioned in said liquid near the entrance of said pump and the opposite end connected to the second end of said differential-pressure measuring device.

3. In a system for measuring the net positive suction head of a pump, a container holding a selected liquid, a pump positioned so that its entrance is in said liquid, a vapor-pressure bulb positioned in said liquid near the entrance to said pump, a differential-pressure measuring device having a first and second end, the first end being connected to said vapor-pressure bulb, a stagnation-pressure bulb having one end positioned in said liquid near the entrance to said pump and the opposite end connected to the second end of said differential-pressure measuring device and means connected to said stagnation-pressure tube for maintaining the liquid-gas interface at approximately the end of said stagnation-pressure tube positioned in said liquid.

4. The system set forth in claim 3 wherein said last-mentioned means comprises a source of gas.

5. In a system for measuring the net positive suction head of a pump, a container holding a selected liquid, a pump positioned so that its entrance is in said liquid, a vapor-pressure bulb positioned in said liquid near the entrance to said pump, a differential-pressure measuring device having a first and second end, a vapor-pressure tube connecting said vapor-pressure bulb to the first end of said differential-pressure measuring device, means for preventing undesired condensation of liquid in said vapor-pressure tube, and a stagnation-pressure tube having one end positioned in said liquid and near the entrance to said pump and the opposite end connected to the second end of said differential-pressure measuring device.

6. In a system for measuring the net positive suction head of a pump, a container holding a selected liquid, a pump positioned so that its entrance is in said liquid, a vapor-pressure bulb positioned in said liquid near the entrance of said pump, a differential-pressure measuring device having a first and second end, a vapor-pressure tube connecting said vapor-pressure bulb to the first end of said differential-pressure measuring device, means for preventing undesired condensation of liquid in said vapor-pressure tube, a stagnation-pressure tube having one end positioned in said liquid near the entrance of said pump and the opposite end connected to the second end of said differential-pressure measuring device, and means connected to said stagnation-pressure tube for maintaining the liquid-gas interface at approximately the end of said stagnation-pressure tube positioned near the entrance of said pump.

7. In a system for measuring the net positive suction head of a pump, a container holding a selected liquid, a pump positioned so that its entrance is in said liquid, a vapor-pressure bulb positioned in said liquid near the entrance of said pump, a differential-pressure measuring device having a first end and a second end, a vapor-pressure tube connecting said vapor-pressure bulb to the first end of said differential-pressure measuring device, means for preventing undesired condensation of liquid in said vapor-pressure tube, an expansion chamber connected to said vapor-pressure tube, a stagnation-pressure tube having one end positioned in said liquid near the entrance of said pump and the opposite end connected to the second end of said differential-pressure device, and means connected to said stagnation-pressure tube for maintaining the liquid-gas interface at approximately the end of said stagnation-pressure tube positioned near the entrance of said pump.

References Cited in the file of this patent

UNITED STATES PATENTS

| | | |
|---|---|---|
| 2,002,101 | Valby et al. | May 21, 1935 |
| 2,860,516 | Bardonnet et al. | Nov. 18, 1958 |